Patented May 31, 1932

1,860,730

UNITED STATES PATENT OFFICE

BENJAMIN T. BROOKS, OF GREENWICH, CONNECTICUT, AND EUGENE J. CARDARELLI, OF NEWARK, NEW JERSEY

ORGANIC ACID-POLYHYDRIC ALCOHOL RESINS

No Drawing.   Application filed June 16, 1930. Serial No. 461,643.

This invention relates specifically to a new and useful improvement, to-wit, the resin produced by the condensation of Δ 4 cyclohexene 1—2 dicarboxylic acid and glycerine, or a glycol; with the glycerine or glycol we include also polyglycerine and polyglycols, viz, those compounds formed by coupling up two or more molecules of glycol or glycerine. Where glycerine is employed it may be either the normal glycerine or a substituted glycerine in which one of the hydroxyl hydrogens may be substituted by a radical. Such substituent radical is preferably a fatty acid or alkyl radical. With polyglycerine or a polyglycol a fatty acid or alkyl radical may similarly be substituted for one or more of the hydroxyl hydrogens, although such substitution should in any case be limited so as to leave at least two hydroxyl groups in the compounds. It will be apparent from the foregoing that whether we start with a glycol, a glycerine, a partially substituted glycerine, a partially substituted polyglycerine, or a partially substituted polygylcol, the resulting compound will contain at least two hydroxyl groups. Generally speaking, we may employ compounds of this sort which contain two or more hydroxyl groups and all such compounds will be hereinafter generically designated as polyhydric alcohols or a polyhydric alcohol. As previously stated, with a glycerine, polyglycerine or a polyglycol, a fatty acid or alkyl radical may be substituted for one or more of the hydroxyl hydrogens, provided, of course, that the substitution is limited so as to leave at least two hydroxyl groups in the resulting compound. This substitution may be made by the customary process of esterification, and compounds of this sort may be hereinafter referred to as "the fatty acid esters of the polyhydric alcohols." The acid with which said polyhydric alcohol is condensed may be either hydride or anhydride, and the term "Δ 4 cyclohexene 1—2 dicarboxylic acid" as hereinafter employed in this specification and the appended claims shall denote generically either the acid or its anhydride.

The said acid may be generated by various methods, although we find that an especially convenient process consists in warming together butadiene and maleic acid or anhydride. For this purpose the butadiene and maleic acid or anhydride are mixed, preferably in substantially molecular proportions, and heated together to a time and temperature sufficient to cause the conversion of the reacting components into the desired acid. A temperature of from 95 to 120° C. may be conveniently applied for this purpose and within this temperature range a reacting time of a few hours, for example, not exceeding five hours, has been found sufficient for substantially complete conversion. In place of the pure butadiene we may alternatively employ hydrocarbon mixtures containing the same. We may, for example, separate by distillation, preferably by rectification, from the products of cracking petroleum oil, a hydrocarbon fraction the olefine content of which consists predominantly of olefines of 4 carbon atoms to the molecule. Such a cut ordinarily contains butadiene, and especially where the cracking has been relatively extensive as, for example, liquid phase cracking carried out at temperatures of about 950° to 1000° F. or in vapor phase at any pressure, the said cut will contain very substantially proportions of butadiene. Where the cracked material was prepared by vapor phase cracking carried out, for example, at temperatures between 1050° and 1150° F., such a cut will ordinarily contain from 10 to 30% of butadiene. Such cut may, as stated, be admixed with maleic acid in substantially molecular proportions based on the butadiene present. On heating the mixture to a temperature of from 95 to 120° C. the aforementioned acid is formed which is substantially insoluble in the remanent hydrocarbon mixture and may be separated therefrom by stratification and/or distillation. The reaction product crude Δ 4 cyclohexene 1—2 dicarboxylic acid or its anhydride may be purified by crystallizing from hot water.

In our preferred procedure, however, we first separate the butadiene from such a fraction by suitable processes more fully described in co-pending application, Serial No.

433,426, and employ the substantially pure butadiene so recovered in forming the said acid compound. A solvent in which the raw materials and the reaction products are soluble may be employed, as for example benzol.

The acid reaction product corresponds presumably to the following formula:

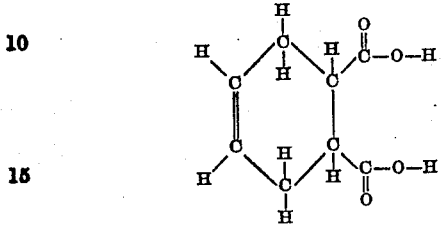

The anhydride of the said acid corresponds presumably to the following formula:

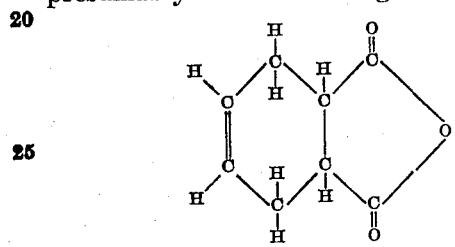

Methods of generating the glycols and the glycerine or the partially substituted glycerine are well known in the art and will not be herein described.

In generating the synthetic resin the said acid and polyhydric alcohol containing not less than two hydroxyl groups are mixed and heated. Generally speaking, it may be stated that we employ a temperature sufficient to effect condensation of the reactants and this may be ascertained by any chemist familiar with this description, inasmuch as the physical characteristics of the resin produced differ from the physical characteristics of the reactants. When working with glycerine or a glycol, we preferably employ a temperature approximating the boiling point of the glycol or glycerine employed, inasmuch as this temperature may be easily controlled at atmospheric pressure by use of a reflux condenser. The invention is not however limited to this temperature or, in fact, to any temperature. Higher temperatures may, of course, be employed by the application of pressure, although we do not believe that temperatures in excess of 300° C. would be desirable. The time of heating and the temperature are adjusted to obtain the desired characteristics of the finished resin. For example, the longer the time of heating at any selected time or temperature the more viscous the resin becomes until finally it sets or jells. The hardness on cooling undergoes a corresponding increase with prolongation of the heating time at any selected temperature and the solubility in solvents undergoes a substantially parallel diminution. The employment of a substituted glycerine is desirable where the solubility of the resin in organic solvents is desired to be increased. In general, it may be stated that the glycerines with the longer fatty acid or alkyl radicals in the substituent groups manifest the greater solubility in organic solvents.

We may heat the said acid and polyhydric alcohol containing not less than two hydroxyl groups in any proportions and separate the finished resin from the excess of either component; with glycerine we preferably employ substantially 3 mols of the said acid in admixture with 2 mols of glycerine and we preferably employ the anhydride of the said acid.

The resin so produced may be fluid or plastic at elevated temperatures, and by appropriate control of the heating time may be converted into a resin which is fluid or semi-fluid at higher temperatures setting at normal temperatures to a smooth impervious solid which may be employed either alone or in combination with other resins, diluents, fillers, etc.; for the manufacture of moulded articles. The resin may also be dissolved in organic solvents either alone or in combination with other resins and coating materials to form coating composition. Various uses will, of course, be found for these new products.

The foregoing description is for purposes of illustration and is not intended by way of limitation. It is therefore our intention that the invention be limited only by the appended claims or their equivalents in which we have endeavored to claim broadly all inherent novelty.

We claim:

1. A synthetic resin comprising the condensation product of Δ 4 cyclohexene 1—2 dicarboxylic acid and a polyhydric alcohol.

2. A synthetic resin comprising the condensation product of Δ 4 cyclohexene 1—2 dicarboxylic acid and an aliphatic acid ester of a polyhydric alcohol, said ester containing not less than two hydroxyl groups.

3. A synthetic resin comprising the condensation product of Δ 4 cyclohexene 1—2 dicarboxylic acid anhydride and a polyhydric alcohol.

4. A synthetic resin comprising the condensation product of Δ 4 cyclohexene 1—2 dicarboxylic acid anhydride and an aliphatic acid ester of a polyhydric alcohol, said ester containing not less than two hydroxyl groups.

5. A synthetic resin comprising the condensation product of Δ 4 cyclohexene 1—2 dicarboxylic acid and a glycerine in which one of the hydroxyl hydrogens of said glycerine may be substituted by an aliphatic acid radical.

6. A synthetic resin comprising the condensation product of Δ 4 cyclohexene 1—2 dicarboxylic acid and a glycerine.

7. A synthetic resin comprising the condensation product of Δ 4 cyclohexene 1—2 dicarboxylic acid anhydride and a glycerine in which one of the hydroxyl hydrogens of said glycerine may be substituted by an aliphatic acid radical.

8. A synthetic resin comprising the condensation product of Δ 4 cyclohexene 1—2 dicarboxylic acid anhydride and glycerine.

9. Process of forming a synthetic resin which comprises heating together Δ 4 cyclohexene 1—2 dicarboxylic acid and a polyhydric alcohol.

10. Process of forming a synthetic resin which comprises heating together Δ 4 cyclohexene 1—2 dicarboxylic acid and an aliphatic acid ester of a polyhydric alcohol, said ester containing not less than two hydroxyl groups.

11. Process of forming a synthetic resin which comprises heating together Δ 4 cyclohexene 1—2 dicarboxylic acid and a glycerine in which one of the hydroxyl hydrogens of said glycerine may be substituted by an aliphatic acid radical.

12. Process of forming a synthetic resin which comprises heating together Δ 4 cyclohexene 1—2 dicarboxylic acid and a glycerine in which one of the hydroxyl hydrogens of said glycerine may be substituted by an alkyl radical.

13. Process of forming a synthetic resin which comprises heating together Δ 4 cyclohexene 1—2 dicarboxylic acid and glycerine.

BENJAMIN T. BROOKS.
EUGENE J. CARDARELLI.